United States Patent [19]

Nötzel et al.

[11] 4,417,809
[45] Nov. 29, 1983

[54] PATTERN SCANNING DEVICE FOR COPYING MACHINES

[75] Inventors: Joachim Nötzel; Anton Schätz, both of Munich; Harthmuth Buczek, Altenerding; Günther Kirchhof, Taufkirchen, all of Fed. Rep. of Germany

[73] Assignee: Agfa-Gevaert Aktiengesellschaft, Leverkusen, Fed. Rep. of Germany

[21] Appl. No.: 348,453

[22] Filed: Feb. 12, 1982

Related U.S. Application Data

[63] Continuation of Ser. No. 116,872, Jan. 30, 1980, abandoned.

[30] Foreign Application Priority Data

Feb. 15, 1979 [DE] Fed. Rep. of Germany ....... 2905740

[51] Int. Cl.$^3$ .............................................. G03B 27/44
[52] U.S. Cl. ...................................................... 355/46
[58] Field of Search ............................ 355/46; 352/81; 350/167

[56] References Cited

U.S. PATENT DOCUMENTS 1,984,004 12/1934 Wildhaber .............................. 352/81
3,447,438 6/1969 Kaufer et al. ....................... 350/167
3,584,950 6/1971 Gundlach ............................ 350/167

Primary Examiner—Monroe H. Hayes
Attorney, Agent, or Firm—Michael J. Striker

[57] ABSTRACT

The pattern scanning projection device for copying machines of the type in which a pattern is projected in a strip-like manner on an image recording support by means of a pattern scanning unit which is movable in guiding grooves and includes a plurality of scanning lens plates. The lens plates for the sake of uniform projection of partial images cooperate with aperture and/or image field diaphragms and with separating diaphragms. The lens plates are individually insertable into an objective housing which is detachable from the copying machine. The housing is assembled of two parts, one housing part being provided with mounting longitudinal grooves engaging one longitudinal edge of respective lens plates and the lens plates being centered in the longitudinal grooves by separate centering grooves and being secured in central position at one point only so as to permit longitudinal displacement due to mechanical or thermal stresses. The other longitudinal edges of the plates are covered by the other housing part which is preferably made of a plastic material. The entrance and the discharge ports of the objective housing are hermetically sealed by glass panes.

15 Claims, 7 Drawing Figures

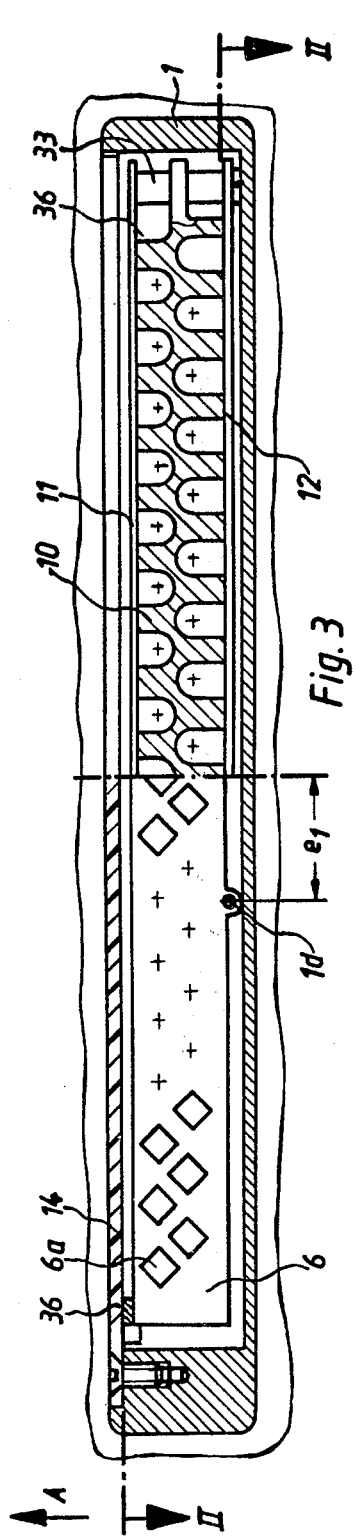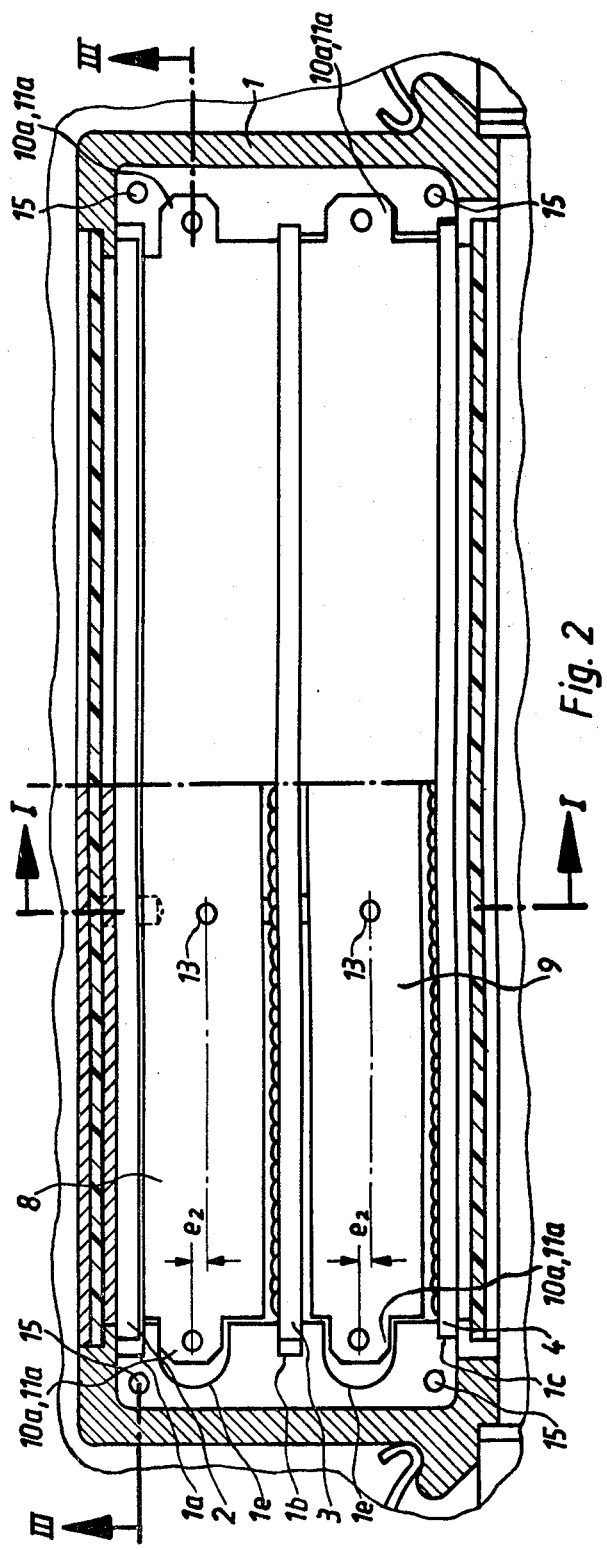

PATTERN SCANNING DEVICE FOR COPYING MACHINES

This is a continuation of application Ser. No. 116,872, filed Jan. 30, 1980, now abandoned.

BACKGROUND OF THE INVENTION

This invention relates generally to copying machines of the type in which the original or pattern is projected in a strip-like manner on an image recording support by means of a pattern scanning unit movable in guiding grooves of an objective housing along the pattern and including a plurality of scanning lens plates which for the sake of uniform projection of the composed image resulting from the subsequent or overlapping partial image projections cooperate with a plurality of diaphragms such as, for example, aperture diaphragm and/or image field diaphragm or separating diaphragm preventing overlapping of respective strip-like partial images. In particular, this invention relates to the pattern scanning unit for such copying machines.

The pattern scanning devices for copying machines of the aforedescribed type are described for example in the German Pat. No. 1,203,115 and in the German published patent application No. 2,421,661. The disadvantage of such prior art scanning devices, however, is in a relatively complicated production and in the sensitivity to manufacturing inaccuracies or to changes resulting from mechanical or thermal stresses.

SUMMARY OF THE INVENTION

It is, therefore, a general object of the present invention to overcome the aforementioned disadvantages.

More particularly, it is an object of the invention to provide an improved scanning device for copying machines of the aforedescribed type which can be easily manufactured.

An additional object of the invention is to provide such an improved scanning device which is resistant against temperature and moisture influences and well protected against dust and against scratching of the sensitive upper surfaces of plastic projection lenses.

In keeping with these objects and others which will become apparent hereafter, one feature of the invention resides, in an original or pattern scanning device for copying machines of the aforedescribed type in the provision of a separate protective housing insertable into the copying machine, the housing being provided with mounting grooves for receiving and holding in position respective scanning lens plates. Preferably, the objective housing is made of a cast metal such as injection dye cast zinc.

In the preferred embodiment of this invention the objective housing is provided with mounting projections resting on seats provided on the copying machine in such a manner as to be adjustable in the direction of the optical axis of the scanning projection elements. The mounting projections are provided with arresting recesses for engaging mounting springs connected to the copying machine.

The metal objective housing which is formed as a separate exchangeable unit and cooperating with the adjustable seats on the frame of the copying machine enables in a most advantageous manner protection of the scanning projection elements against mechanical deformation which might otherwise result due to vibrations, due to variations in manufacturing tolerances or due to thermal stresses.

A particularly simple installation of the scanning objective is attained, according to another feature of this invention when the objective housing is assembled of parts extending parallel to the lens plates and parallel to the optical axis of respective scanning projection elements. For instance, the housing has a cup-shaped metal portion formed with the mounting grooves into which the lens plates are inserted from the open side and the cup-shaped portion is covered with a cover plate of a plastic material. Preferably, the plane of the gap between the metal housing part and the plastic cover is sealed by means of plastic sealing strips and/or by means of labyrinth-like sealing grooves in the plastic cover which protect the interior of the housing against dust and moisture. The juxtaposed open sides of the housing parallel to the planes of the lens plates are closed by cover plates cemented to the edge of the openings and being sealed by the labyrinth-like recesses in the plastic cover. The glass cover plates permit the passage of light rays from the scanned pattern and to the projection image plane.

Due to the above-described measures, it is attained that the sensitive upper surfaces of plastic lens plates are protected not only against dust and scratching, but it is attained also that the variable moisture content of the ambient air affects the scanning objective only in a considerably reduced and delayed degree. Such moisture variations, apart from natural climate variations which always are present in certain limits, are mostly generated by the temperature differences in the housing during the operation of the copying machine, namely between the rest temperature and the operational temperature of the latter. These temperature differences normally lead to different moisture accumulation on the plastic material of the lens plates and in the case when such variable moisture accumulation takes place in short time intervals produce irregular deformations of the projection elements which adversely affect the quality of the projected image in the scanning objective.

According to another feature of this invention, the lens plates are supported in juxtaposed mounting grooves for free movement in the mounting groove extending parallel to the longitudinal edge of each lens plate and the lens plate is secured against longitudinal displacement by means of a single centering attachment engaging a corresponding recess in the inner wall of the objective housing. The centering attachments for all lens plates are arranged in a single common plane extending perpendicularly to the plane of the lens plates. It is also advantageous when the aperture and image field diaphragms and, if desired, the separating diaphragms are supported for longitudinal displacement in the housing and are centered by means of additional centering attachments extending in the plane of the centering attachments for the lens plates. For example, the aperture and field image diaphragms can be mounted in the objective housing by means of flanged or beaded ridges of respective lens plates which permit the longitudinal adjustment of the engaging diaphragm and thereupon are centered together with their lens plates by means of the aforementioned centering attachments.

Due to this arrangement, all changes taking place in the longitudinal dimension of the lens plates due to manufacturing tolerances or due to temperature and moisture variations of the atmosphere surrounding the projecting elements take effect for all projecting elements in the same direction. Consequently, the relative displacement changes between respective lens plates which are necessary for the quality of the projected image are maintained small. The centering attachments define juxtaposed mounting grooves which are separated approximately midway of the clearance of the longitudinal guiding groove which extends parallel to the long edge of each lens plate. Consequently, not only the relative but also the absolute displacement of respective projecting elements within the objective housing remains small and within narrow limits.

A further limitation of the relative displacement of superposed projection elements and the improvement of the quality of the projections is also attained by manufacturing especially the lens plates facing the scanned pattern and the projected image as well as the lens plate arranged in the intermediate image plane by injecting the plastic material in the same lens plate die and by inserting the resulting identical lens plates to the objective housing in the same orientation. Preferably, in order to provide for a positive guide of the correctly oriented lens plates at least one centering attachment is offset from at least one of the two planes of symmetry of each lens plate. In this manner the spacing of lenses in respective projection channels remain absolutely parallel even when increased deviations in manufacturing tolerances occur and consequently a complete correlation of complementary partial images composed in the complete projected image is attained without special requirements on the manufacturing accuracy.

According to still another feature of this invention the separating diaphragms are in the form of the so-called honeycomb diaphragms manufactured by an injection process from a suitable plastic material. The injection cast honeycomb diaphragm body has an opening defined by three sides whereas the other sides are open and are covered by a cover strip supporting the desired centering attachments.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawing.

BRIEF DESCRIPTION OF THE DRAWING

FIG. 1b is a partial sectional view along line b—b of FIG. 1a;

FIG. 1c is a partial sectional view along line c—c of FIG. 1b;

FIG. 2 is a sectional view of the device of this invention taken along the line II—II of FIG. 3;

FIG. 3 is a sectional view of the device of FIG. 2 taken along the line III—III.

DESCRIPTION OF THE PREFERRED EMBODIMENTS

Figure 1:
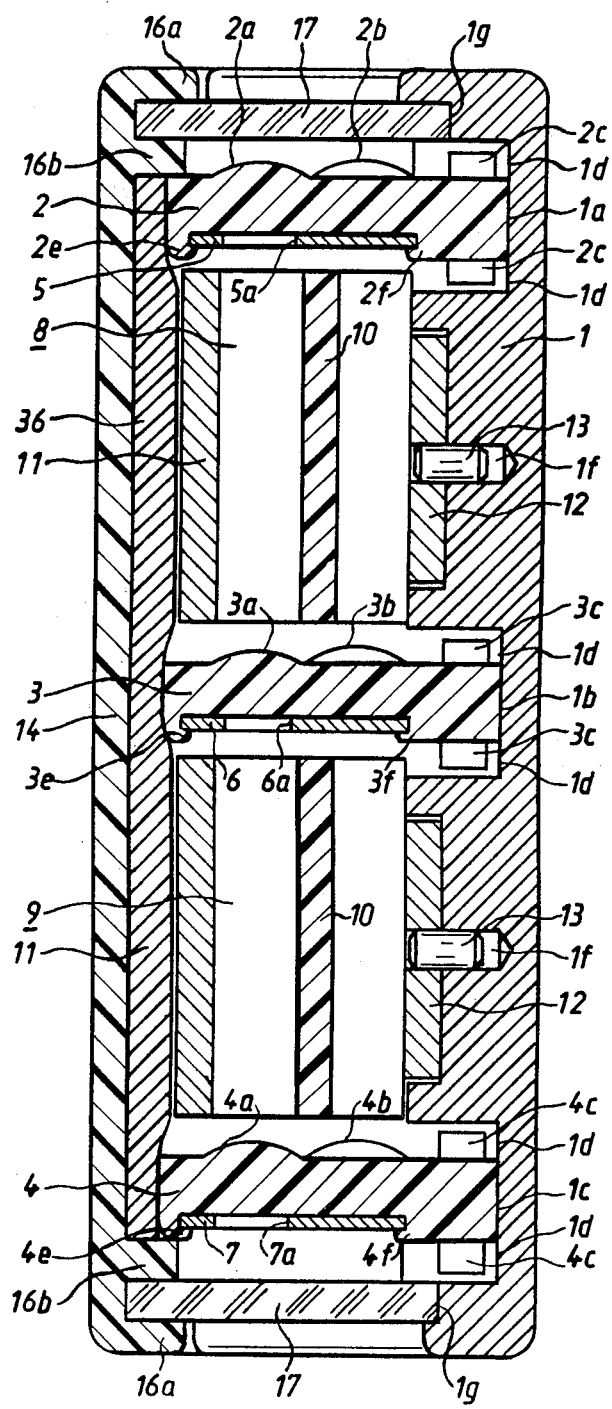
FIG. 1 is a sectional side view of the scanning projection device of this invention taken on an enlarged scale along the line I—I in FIG. 2.

Referring to FIGS. 1 to 3, the scanning device of this invention is formed by an objective housing 1 defining longitudinal mounting grooves 1a through 1c. Elongated lens plates 2, 3 and 4 made respectively as a one-piece step of plastic material such as, for example, polymethylmetracylate (PMMA) by a diecasting process. The extreme lens plates 2 and 4 operate in a known manner as the projection lens plates whereas the intermediate lens plate 3 of the projection system acts as the image field lens plate. Each lens plate is formed with two rows of lenses 2a, 2b or 3a, 3b or 4a, 4b. The individual rows of lens elements extend transversely to the direction of travel play (FIG. 3) of the pattern to be copied and are staggered relative to each other. In order to compensate for manufacturing inaccuracies in respective lens plates, all three plates 2 to 4 are made by an injection molding process in a one-piece die and the completed plates are inserted into the housing 1 with the same orientation. It is evident that in order to achieve a perfect image field lens effect the intermediate field lens plate 3 can be assembled of two aforementioned lens plates which together have a half focal length or a double power of refraction of undivided lens plates.

The lower surface portions of the respective lens plates 2 to 4 rest on centering attachments 2c, 3c and 4c projecting into respective longitudinal grooves 1d of the objective housing 1. As seen in FIG. 2, the centering attachments define opposite mounting grooves for respective lens plates 2 to 4 and allow certain play for displacement of the plates in their longitudinal direction. The longitudinal grooves 1d for all lens plates are provided in a single plane in a major inner wall of the objective housing 1. This plane is set about a relatively small distance $e_1$ from the plane of symmetry of the scanned pattern and of the projection support. Due to the fact that the individual lens plates are always in abutment with stop surfaces lying in a single plane and being substantially at a center of longitudinal guiding grooves, all unintentional dimensional deviations of the three lens plates occurring due to different manufacturing tolerances or due to temperature and moisture variations of the ambient air take effect substantially in the same direction. As a consequence, the relative displacement between the superposed lens plates which is most relevant for the quality of the projected image of the optical system is thus kept to a minimum.

Figure 1A:
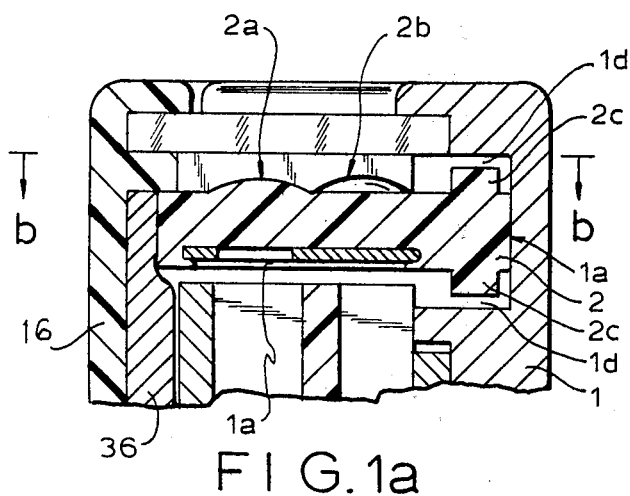
FIG. 1a is a partial sectional view along line a—a of FIG. 1b.
Figures 1B, 1C:
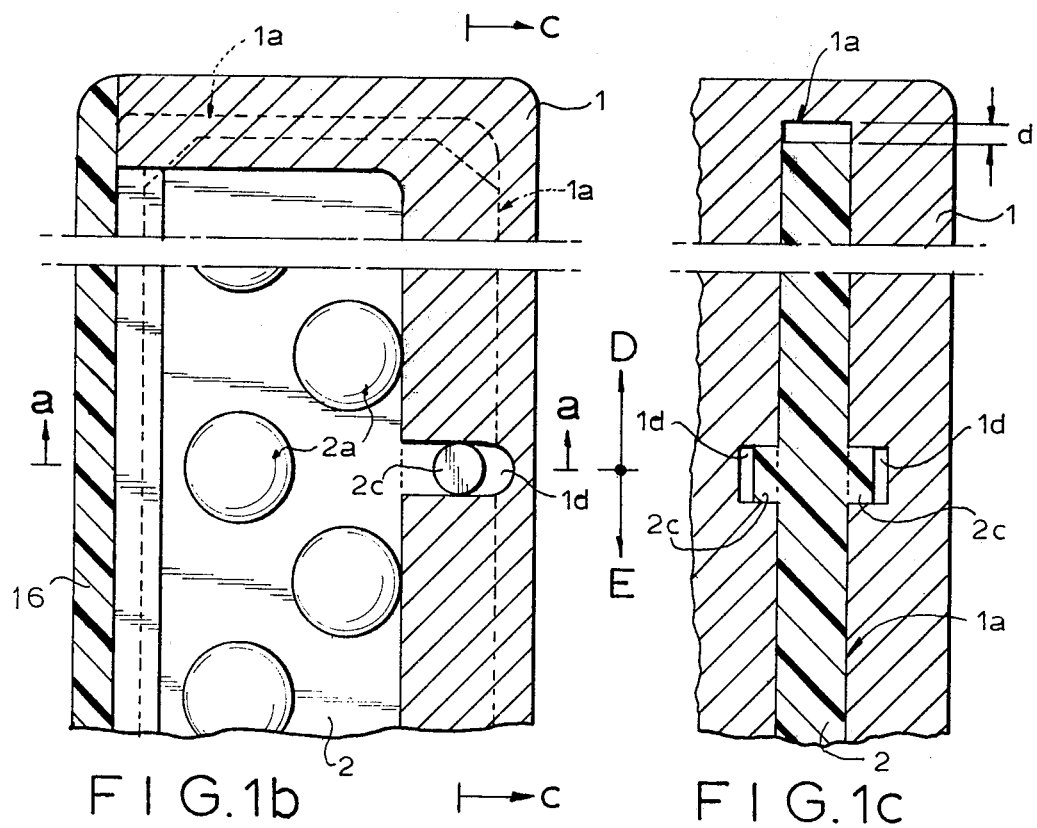

As seen in FIGS. 1a 1b and 1c a centering attachment 2c shown only for one lens plate 2 of FIG. 1 is engaged in the groove 1d such that the limited displacement of the lens plate in the longitudinal direction is permitted but the lens plate is arrested at a single point in a plane extending perpendicularly to the elongation of the lens plate. A possible displacement of the lens plate 2 in the longitudinal direction is designated as "d" in FIG. 1c.

Due to the fact that the centering attachments 2c, 3c and 4c are offset relative to the plane of symmetry of the respective lens plates about a minute amount $e_1$ which, nonetheless, is larger than the longitudinal play provided for the lens plates in the mounting grooves 1a, 1b and 1c there is provided a positive or guided orientation of the lens plates when inserted into the objective housing. In this manner it is ensured that each of the lens plates is inserted into the housing in a correct orientation. It is thus made possible that also lens plates having relatively large deviations in manufacturing tolerances can be combined into a flawless projection system provided that care is taken to orient the plates in such a manner as to mutually compensate for manufacturing defects. As mentioned above, to keep the manufacturing differences at minimum, the three lens plates 2, 3 and 4 are manufactured respectively as a one-piece of a plastic material and are inserted into the housing in the same orientation.

As it can be seen from FIG. 1 each of the lens plates 2, 3 and 4 has its rear side provided with flanged or beaded edges 2e, 2f or 3e, 3f or 4e, 4f, which hold in position diaphragm plates 5, 6 and 7 made of a striplike hard polyvinyl chloride (PVC) plastic material by stamping. The diaphragm plates 5 and 7 have circular apertures 5a and 7a to function as aperture diaphragms for limiting the effective opening of the lens elements 2a, 2b and 4a, 4b. The apertures 6a of the diaphragm plate 6 operate as apertures for the intermediate image to limit the image field of the intermediate projection. As can be seen from FIG. 3, the openings of the intermediate image diaphragm has square-shape diagonally oriented in the direction A of the movement of the scanned pattern and are dimensioned so that the consecutively arranged opening parts complement themselves in the aforementioned direction A to the size of a complete diagonal. In this manner it is ensured that the projection support passing under this optical system is uniformly expected.

In order to separate individual projection channels, two honeycomb diaphragms 8 and 9 are arranged between the lens plates. The honeycomb diaphragms 8 and 9 include a honeycomb body 10 formed by an injection process from a plastic material such as, for example, acrylonitrilebutadienestyrolcopolymerisate (ABS) having honeycomb openings open to the edges of the plates and covered by metal strips 11 and 12. The cover strips 11 and 12 are firmly connected to the diaphragm body 10 by means of grooves 33. It can be seen particularly from FIG. 2, the ends of separating diaphragms 8 and 9 are formed with guiding projections 10a and 11a engaging recesses 1e in the objective housing. The axis of symmetry of these guiding projections 10a and 11a is offset relative to the axis of symmetry of the honeycomb diaphragms 8 and 9 about an amount $e_2$. As a consequence, these honeycomb diaphragms are insertable into the mounting recesses 1e in the objective housing in one uniform orientation. The separating diaphragms 8 and 9 are held in position in the housing 1 by means of arresting pins 13 extending between recesses 1f in the housing wall and passing in the metal plate 12. Upon the insertion of the lens plates 2, 3 and 4 and of the honeycomb diaphragms 8 and 9 into the objective housing, the latter is covered by cover plate 16 made of a plastic material such as, for example, polycarbonate (PC), which also holds lens plates and the diaphragms in their positions. The cover plate 16 is secured to the metal cup-shaped housing part 1 by screws 15 and presses, by means of interposed plastic strips 36 of a foamed material on the upper edges of the lens plates and of the honeycomb diaphragms. The juxtaposed front and rear edges of the cover plate 16 are provided with projecting ribs 16a and 16b engaging marginal portions of glass pane 17 which at the other side is supported and cemented in a corresponding recess 1g in the metal part of the housing 1. In this manner, there is provided a labyrinth-like seal for the gap between the cover plate 16 and the housing 1 which prevents any penetration of dust and moisture into the interior of the housing.

Figure 4:
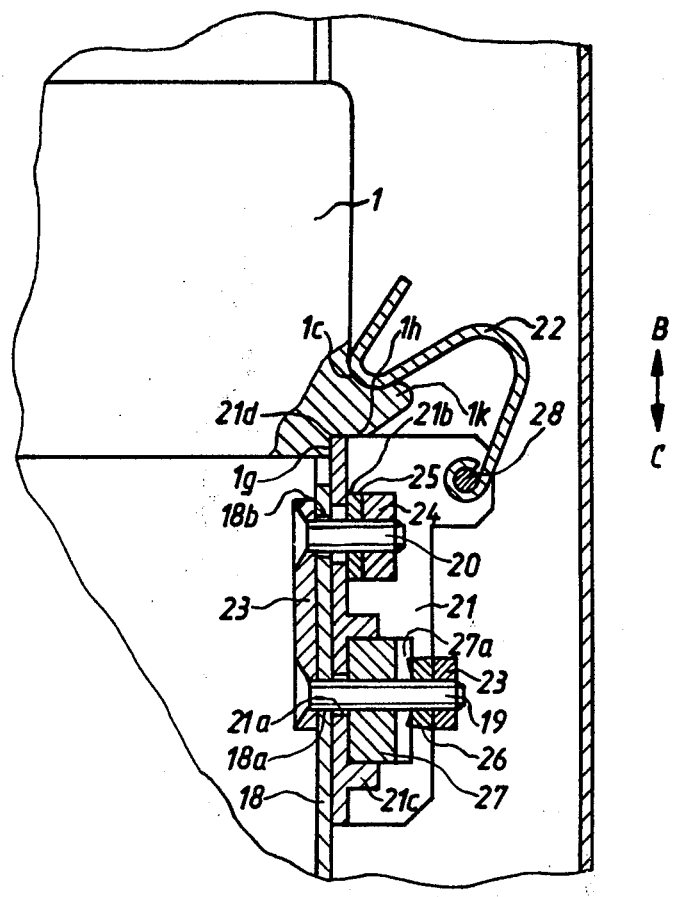
FIG. 4 is a cut-away sectional view of the adjustable attachment of the device of this invention to a copying machine.

FIG. 4 illustrates adjusting and locking means for mounting the objective housing 1 on the frame plate 18 of the copying machine. The frame plate 18 is provided with two projecting screws 19 and 20 which adjustably support a mounting bracket 21 provided with pivotable holding springs 22 which are engageable with mounting projections 1k formed on the upper surface of the objective housing 1. The screws 19 and 20 are interconnected by a connecting piece 23 and pass through tightly fitting holes 18a and 18b in the frame plate 18 and further pass through larger holes 21a and 21b in the wall of the mounting bracket 21. Screw 19 supports for rotation an eccentric 27 which engages an annular flange 21c on the inner wall of the mounting brackets 21. The eccentric is formed with a control slot 27a. By applying a suitable tool into the control slot 27a, the eccentric 27 is rotated and adjusts the vertical position of the mounting bracket 21 in the direction of arrows B and C. After the vertical adjustment is completed, the mounting bracket is firmly secured to the frame plate 18 by tightening nuts 23 and 24 which cooperate with washers 25 and 26. The adjustable mounting bracket 21 makes it possible that abutment surfaces 1g and 1h of the objective housing 1 which rests on the edge 21d of the bracket 21 can change their position relative to the frame of the copying machine and thus the whole pattern scanning system is adjustable relative to the scanned pattern.

Upon insertion of the housing 1 into the copying machine, the former is locked by arresting springs 22 which engage into the arresting recesses 1i in the projection 1k on the housing 1. The arresting springs 22 are pivotably supported on a pin 28 on the mounting brackets 21.

It will be understood that each of the elements described above, or two or more together, may also find a useful application in other types of constructions differing from the types described above.

While the invention has been illustrated and described as embodied in a specific example of the pattern scanning unit of a copying machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pattern scanning device for copying machines of the type in which a pattern is projected in a striplike manner by a plurality of elongated pattern scanning lens plates on an image recording support whereby the scanning lens diaphragms, the copying machine being provided with adjustable supports, the scanning device comprising an objective housing including two parts assembled into a unit detachable from the copying machine, said housing parts being spaced from one another so as to form longitudinal mounting grooves to receive the lens plates and the diaphragms therebetween, one of said housing parts engaging respective longitudinal edges of said lens plates and being formed with transversal guiding grooves provided in parallel planes for all said lens plates and operative for guiding respective lens plates when the latter are inserted into said housing; said lens plates being each formed with centering means projecting into the respective guiding groove and adapted for permitting limited displacement of the respective lens plate in its longitudinal direction within the respective longitudinal mounting groove, the centering means of all lens plates arresting all of said lens plates at single points lying in said parallel planes extending perpendicularly to the elongation of said lens plates; and securing means for securing said lens plates and said diaphragms in a fixed position, the other housing part sealingly closing said one housing part.

2. The scanning device as defined in claim 1, wherein said one of said housing parts is made of metal by an injection molding process.

3. The scanning device as defined in claim 1, wherein said objective housing is provided on its upper surface with arresting projections cooperating with the adjustable supports of the copying machine, said supports being adjustable in the direction of optical axis of said lens plates.

4. The scanning device as defined in claim 3, wherein said projections are provided with arresting recesses and said adjustable supports are provided with pivotable arresting springs engageable with said recesses.

5. The scanning device as defined in claim 1, wherein said housing parts are separated along a plane extending parallel to the planes of said lens plates.

6. The scanning device as defined in claim 5, wherein said one housing part is cast of metal whereas the other housing part is made of a plastic material.

7. The scanning device as defined in claim 6, wherein said housing parts are sealed by means of elastic sealing strips and by means of labyrinth-like projections formed on said plastic housing part to protect the interior of the objective housing against dust and moisture.

8. The scanning device as defined in claim 7, wherein said objective housing defines inlet and outlet openings adjoining the corresponding lens plates and includes glass plates sealingly covering said inlet and outlet openings.

9. The scanning device as defined in claim 1, wherein said separating diaphragms are held in position in said housing by arresting pins mounted in the plane of said centering means.

10. The scanning device as defined in claim 9, wherein said lens plates are provided with beaded edges engaging said aperture and image field diaphragms.

11. The scanning device as defined in claim 9, wherein said separating diaphragms are made of a honeycomb diaphragm body of a plastic material defining honeycomb apertures open toward the edges of said diaphragm body and being covered by covering plates defining recesses at their opposite ends.

12. The scanning device as defined in claim 11, wherein said recesses are offset from the axis of symmetry of said honeycomb body.

13. The scanning device as defined in claim 1, wherein said lens plates are made respectively as a one-piece plastic plate by an injection molding process in the same die and said lens plates being inserted into respective longitudinal guiding grooves and centering means in the same orientation.

14. The scanning device as defined in claim 13, wherein said centering means for the sake of a guided orientation are arranged outside of at least one of the two planes of symmetry of each lens plate.

15. The scanning device as defined in claim 1, wherein said centering means arrest the respective lens plates substantially midway between the sidewalls of said guiding grooves.

* * * * *